No. 731,142. PATENTED JUNE 16, 1903.
O. TORGERSON.
DRAFT EQUALIZER.
APPLICATION FILED MAY 31, 1902.
NO MODEL.

WITNESSES:
P. E. Carlsen,
E. C. Carlsen

INVENTOR:
Oscar Torgerson.
BY his ATTORNEY:
A. M. Carlsen.

No. 731,142. Patented June 16, 1903.

UNITED STATES PATENT OFFICE.

OSCAR TORGERSON, OF MAPLETON, NORTH DAKOTA.

DRAFT-EQUALIZER.

SPECIFICATION forming part of Letters Patent No. 731,142, dated June 16, 1903.

Application filed May 31, 1902. Serial No. 109,810. (No model.)

*To all whom it may concern:*

Be it known that I, OSCAR TORGERSON, a citizen of the United States, residing at Mapleton, in the county of Cass and State of North Dakota, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in draft-equalizers; and the main objects of the invention are to provide an equalizer that may be easily changed so as to use it with three or with four horses and to so construct the equalizer that the whiffletrees next to the tongue will find in the tongue a means of rest and guidance, instead of, as in many of the old eveners or equalizers, the tongue is chafed and damaged by the whiffletree, and the latter is held in a slanting position by catching under or on top of the tongue. These and other objects I attain by the novel construction and arrangement of parts illustrated in the accompanying drawings, in which—

Figure 1:
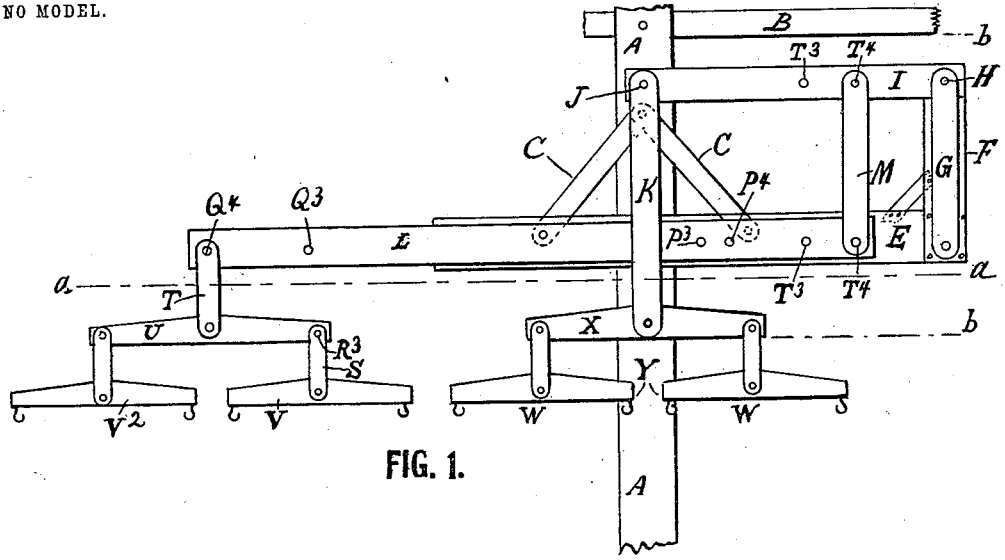
Figure 2:
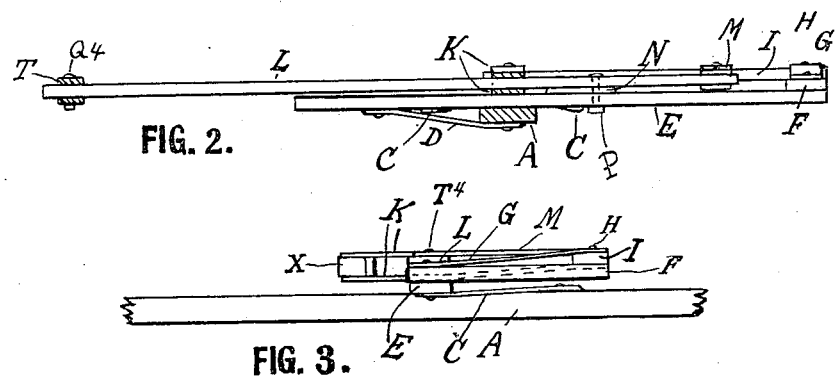
Figure 3:
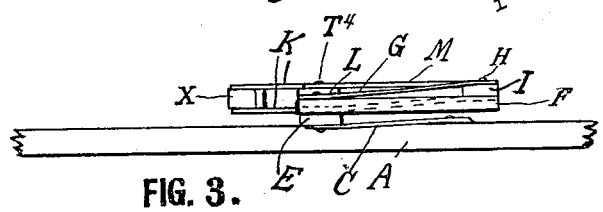

Figure 1 is a top or plan view of my draft-equalizer. Fig. 2 is a sectional front view, as on the line $a\ a$ in Fig. 1; and Fig. 3 is a side view looking from right to left between $b$ and $b$ in Fig. 1, only the tongue extends beyond said points.

Referring to the drawings by letters of reference, A designates the draft-tongue of a reaper or mower or other machine, of which B is a small portion. Upon the tongue A is secured by braces C and D a transverse frame-bar E, from one end of which projects rearwardly a fixed arm F, upon which is secured the metallic strip or bar G. Between the rear ends of said arm and strip is pivoted at H a lever I, of which the opposite end is pivoted at J to a draft-link K, which in Figs. 2 and 3 is shown to be double or consisting of an upper and a lower bar, between which moves the equalizer bar or lever L, which is pivoted to the bar I by means of the link M and is fulcrumed upon the bar E with an interposed supporting-block N by a pin or bolt P, which when four horses are used is placed at $P^4$, and when three horses are used it is placed at $P^3$, and at the same time pin $Q^4$ is moved to hole $Q^3$ and placed in the hole $R^3$ of link S, so that only one horse pulls at whiffletree V, while whiffletree $V^2$, swingletree U, and link T are detached and placed aside and the link M is moved with its pivots to the holes $T^3$. When four horses are to be used, all parts remain as in Fig. 1, with the transferable pivots at the letters having the exponent 4, and the horses are hitched to the four whiffletrees V $V^2$ and W W, of which the latter two are link-connected to the ends of a swingletree X, which is pivoted between the front ends of the large links K, so that the adjacent ends Y of the whiffletrees project upon and normally rest on the tongue, so as to be steadied and guided thereby.

Having thus described my invention, what I claim, and desire to secure by Letters Patent, is—

1. In a draft-equalizer, the combination with a tongue, of the bar E secured across the tongue and having the rearwardly-pointing arm F, the lever I pivoted to said arm and having its opposite end pivoted to the double link K, in line with the tongue, the swingletree X pivoted in the front end of said link, and two whiffletrees link-connected to the ends of the swingletree; the equalizer bar or lever L, fulcrumed to swing horizontally upon the bar E, and having its short arm connected by the link M to the lever I, and means for hitching one or more horses to the long arm of the bar L, substantially as set forth.

2. In a draft-equalizer, the combination with a tongue, of the bar E secured across the tongue and having the rearwardly-extending arm F, the lever I pivoted to said arm and having its opposite end pivoted by the link K to the swingletree X, in line with the tongue, the two whiffletrees W, W, link-connected to the ends of the swingletree; the equalizer-bar L, fulcrumed upon the bar E, and having its short arm connected by the link M to the bar or lever I, and its long end provided with a swingletree and two whiffletrees, detachably connected, so that only one of them may be used when three horses are used; said link M and the pins $P^4$ and $Q^4$ being transferable to the holes $T^3$, $P^3$ and $Q^3$, respectively, substantially as and for the purpose set forth.

In testimony whereof I affix my signature in presence of two witnesses.

OSCAR TORGERSON.

Witnesses:
  P. C. DERRIG,
  CHAS. G. CHURCH.